US012719994B2

(12) United States Patent
Fujii

(10) Patent No.: US 12,719,994 B2
(45) Date of Patent: Aug. 25, 2026

(54) INFORMATION PROCESSING DEVICE, DISPLAY CONTROL METHOD FOR INFORMATION PROCESSING DEVICE, AND RECORDING MEDIUM WITH DISPLAY CONTROL PROGRAM RECORDED THEREON

(71) Applicant: SHARP KABUSHIKI KAISHA, Sakai City (JP)

(72) Inventor: Yosuke Fujii, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 247 days.

(21) Appl. No.: 18/620,841

(22) Filed: Mar. 28, 2024

(65) Prior Publication Data

US 2024/0388665 A1 Nov. 21, 2024

(30) Foreign Application Priority Data

May 18, 2023 (JP) ................................ 2023-082120

(51) Int. Cl.
*H04N 1/00* (2006.01)

(52) U.S. Cl.
CPC ..... *H04N 1/00435* (2013.01); *H04N 1/00411* (2013.01); *H04N 1/00482* (2013.01); *H04N 2201/0094* (2013.01)

(58) Field of Classification Search
None
See application file for complete search history.

(56) References Cited

U.S. PATENT DOCUMENTS 5,788,851 A * 8/1998 Kenley .................. G16H 20/40
361/679.01
2021/0218853 A1* 7/2021 Saeda ................ H04N 1/00424
2024/0388665 A1* 11/2024 Fujii .................. H04N 1/00435

FOREIGN PATENT DOCUMENTS

JP 2009-134215 A 6/2009

* cited by examiner

*Primary Examiner* — Darryl V Dottin
(74) *Attorney, Agent, or Firm* — ScienBiziP, P.C.

(57) ABSTRACT

The display controller causes the operation display unit to display a service continuation confirmation screen to prompt the user to confirm whether to continue the one service, and the service continuation confirmation screen includes a plurality of operation keys including: a first operation key used to instruct the operation display unit to display a first screen that is one of the plurality of operation screens, the first screen being used to receive an operation by the user to set a condition related to the one service again; and a second operation key used to instruct the operation display unit to display a second screen that is another one of the plurality of operation screens different from the first screen, the second screen being used to receive an operation by the user to execute provision of the one service under the same condition.

10 Claims, 12 Drawing Sheets

INFORMATION PROCESSING DEVICE, DISPLAY CONTROL METHOD FOR INFORMATION PROCESSING DEVICE, AND RECORDING MEDIUM WITH DISPLAY CONTROL PROGRAM RECORDED THEREON

TECHNICAL FIELD

The disclosure relates to an information processing device, a display control method for the information processing device, and a recording medium with a display control program recorded thereon, and particularly relates to an information processing device capable of providing a plurality of services, a display control method for the information processing device, and a recording medium with a display control program recorded thereon.

BACKGROUND ART

When one print job ends in a copying device as an information processing device, an end confirmation screen is displayed on a display as an operation display unit. The end confirmation screen is an operation screen for confirming with a user whether the provision of a copying service may be ended when the provision of the copying service ends. The end confirmation screen includes two operation keys, namely an operation key (30*a*) for instructing the end of a copy operation and an operation key (30*b*) for instructing the display to display a copy setting screen. That is, when the user operates the operation key for instructing the end of the copy operation, the copying device transitions to a state of standing by until the copying operation starts again after a process of checking whether any documents are left and the like. On the other hand, a technique has been disclosed in which when the user operates the operation key for instructing the display to display the copy setting screen, the copying device transitions to a state in which the copy setting screen is displayed on the display (particularly, see paragraphs [0035] to [0037] and FIGS. 3 and 5).

SUMMARY

Technical Problem

As described above, according to the disclosed technique, the end confirmation screen includes the two operation keys for making the copying device selectively transition to the two different states. However, for example, if the copy operation is to be continuously performed under the same conditions, the user has to set the conditions again regardless which of the two operation keys is operated. This is cumbersome for the user, meaning that operability is compromised.

In view of this, an object of the disclosure is to provide a novel technique enabling further improvement in operability of an information processing device capable of providing a plurality of services.

Solution to Problem

To achieve this object, the disclosure includes a first disclosure related to an information processing device, a second disclosure related to a display control method for the information processing device, and a third disclosure related to a recording medium recording a display control program for the information processing device.

Among these, the first disclosure related to the information processing device is premised on that the information processing device is capable of providing a plurality of services. Under this premise, the first disclosure includes an operation display unit and a display controller. The operation display unit displays various screens and receives an operation by a user. The display controller causes the operation display unit to display, for each of the plurality of services and in a predetermined order, a plurality of operation screens used to receive an operation by the user, after one service of the plurality of services is selected and until provision of the one service ends. The display controller causes the operation display unit to display a service continuation confirmation screen to prompt the user to confirm whether to continue the one service. The service continuation confirmation screen includes a plurality of operation keys including a first operation key and a second operation key. In particular, the first operation key is an operation key used to instruct the operation display unit to display a first screen that is one of the plurality of operation screens. The first screen is a screen used to receive an operation by the user to set a condition related to the current service again. The second operation key is an operation key used to instruct the operation display unit to display a second screen that is another one of the plurality of operation screens different from the first screen. The second screen is a screen used to receive an operation by the user to execute provision of the one service under the same condition as the current condition.

The display controller causes the operation display unit to display the service continuation confirmation screen when the provision of the one service ends.

The plurality of operation keys of the service continuation confirmation screen may include a third operation key used to instruct an end of the provision of the one service. When the third operation key is operated, a third screen indicating that the provision of the one service has ended may be displayed on the operation display unit for example.

The display controller may further cause the operation display unit to display a service selection screen on which the user selects any of the plurality of services, and when any of the plurality of services is selected on the service selection screen, cause the operation display unit to display a first operation screen of the plurality of operation screens in the above-described order corresponding to the one service selected. The first operation screen as used herein may be referred to as the first screen.

A fourth screen may include a fourth operation key used to instruct the operation display unit to display a predetermined one of the plurality of operation screens of another one of the plurality of services, the fourth screen being a specific operation screen of the plurality of operation screens after the first operation screen as the first screen in the above-described order.

The plurality of operation keys including the first operation key and the second operation key may be arranged adjacent to each other.

When the plurality of operation keys include the third operation key described above, a receipt issuer may be further provided. The receipt issuer issues a receipt related to the provision of the one service when the provision of the one service ends in response to the operation by the user received through the third operation key. The receipt issuer is capable of collectively issuing, when a service related to a receipt (for which a receipt is to be issued) is provided a plurality of times, some or all of the receipts related to the service provided a plurality of times.

In the configuration including such a receipt issuer, when the service related to the receipt is provided a plurality of times, the display controller may further cause the operation display unit to display a receipt setting screen. The receipt setting screen is a screen on which the user sets in which form the receipt is to be issued for the service provided a plurality of times as used herein. In this case, the receipt issuer issues the receipt in the form corresponding to setting content of the receipt setting screen.

The plurality of services of the first disclosure include a copy service in which an image of a document is copied onto a sheet-like image recording medium for example.

The display control method for the information processing device according to the second disclosure of the disclosure is premised on that the information processing device includes an operation display unit that displays various screens and receives an operation by a user, and can provide a plurality of services. Under this premise, the second disclosure includes a display controlling step. The display controlling step includes causing the operation display unit to display, for each of the plurality of services and in a predetermined order, a plurality of operation screens used to receive an operation by the user, after one service of the plurality of services is selected and until provision of the one service ends. The display controlling step further includes causing the operation display unit to display a service continuation confirmation screen to prompt the user to confirm whether to continue the one service. The service continuation confirmation screen includes a plurality of operation keys including a first operation key and a second operation key. In particular, the first operation key is an operation key used to instruct the operation display unit to display a first screen that is one of the plurality of operation screens. The first screen is a screen used to receive an operation by the user to set a condition related to the current service again. The second operation key is an operation key used to instruct the operation display unit to display a second screen that is another one of the plurality of operation screens different from the first screen. The second screen is a screen used to receive an operation by the user to execute provision of the one service under the same condition as the current condition.

The display control program for the information processing device according to the third disclosure of the disclosure is premised on that the information processing device includes an operation display unit that displays various screens and receives an operation by a user, and can provide a plurality of services. Under this premise, in the third disclosure, a computer of the information processing device is caused to execute a display controlling procedure. The display controlling procedure includes causing the operation display unit to display, for each of the plurality of services and in a predetermined order, a plurality of operation screens used to receive an operation by the user, after one service of the plurality of services is selected and until provision of the one service ends. The display controlling procedure further includes causing the operation display unit to display a service continuation confirmation screen to prompt the user to confirm whether to continue the one service. The service continuation confirmation screen includes a plurality of operation keys including a first operation key and a second operation key. In particular, the first operation key is an operation key used to instruct the operation display unit to display a first screen that is one of the plurality of operation screens. The first screen is a screen used to receive an operation by the user to set a condition related to the current service again. The second operation key is an operation key used to instruct the operation display unit to display a second screen that is another one of the plurality of operation screens different from the first screen. The second screen is a screen used to receive an operation by the user to execute provision of the one service under the same condition as the current condition. The display control program is recorded on a non-transitory computer-readable recording medium.

Advantageous Effects of Invention

According to the disclosure, a plurality of operation keys including a first operation key and a second operation key are arranged on a service continuation confirmation screen to prompt a user to confirm whether to continue provision of a service. In particular, when the first operation key is operated, a first screen used to receive an operation by the user to set a condition related to the current service again is displayed. When the second operation key is operated, a second screen used to receive an operation by the user to execute the provision of the service under the same condition as the current condition is displayed. Thus, operability of the information processing device is further improved.

DESCRIPTION OF EMBODIMENTS

Figure 1:
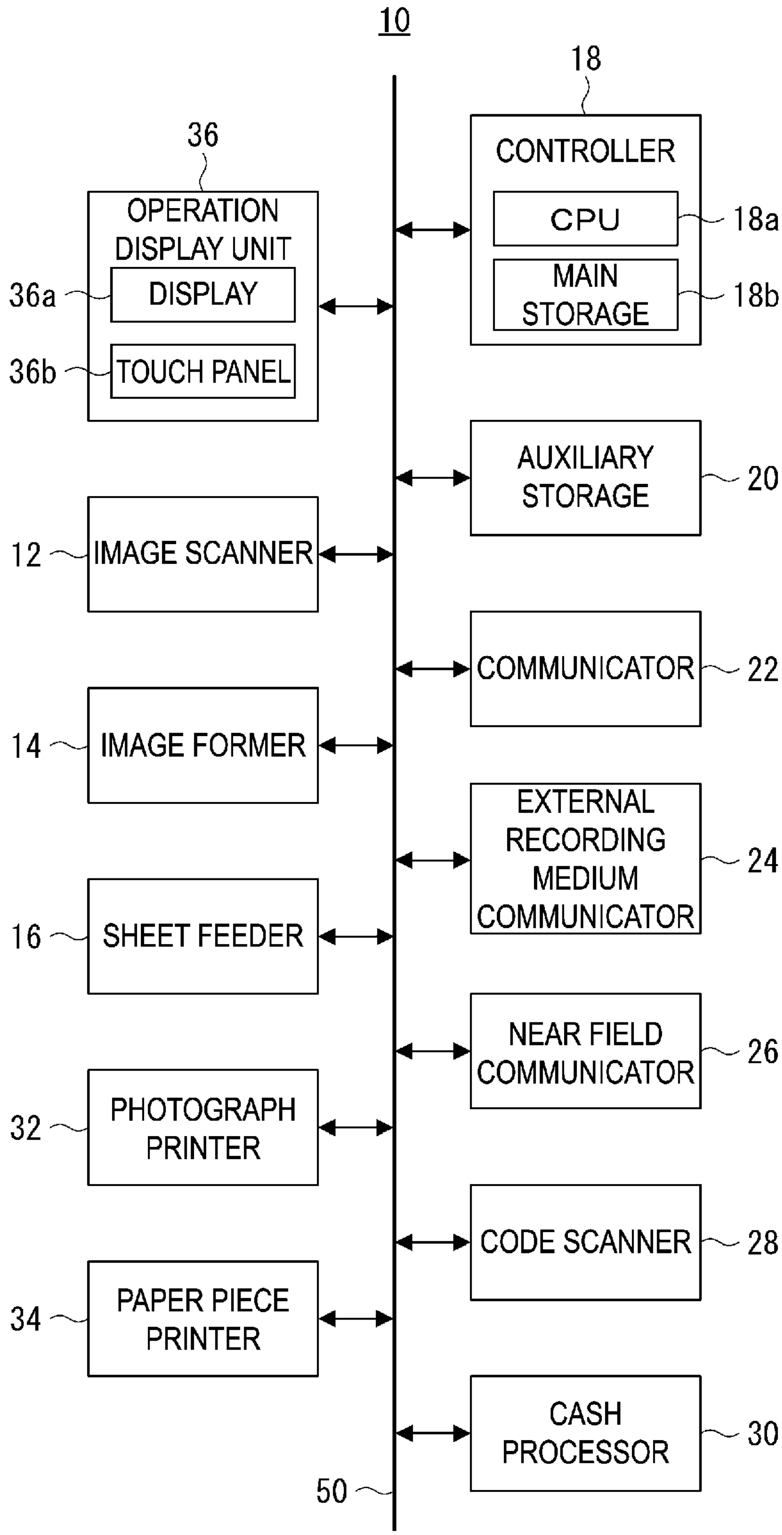
FIG. 1 is a block diagram illustrating an electrical configuration of the image forming device according to an example of the disclosure.

An example of the disclosure will be described by using an image forming device 10 illustrated in FIG. 1 as an example.

The image forming device 10 according to the present example is what is known as a multifunction peripheral (MFP) having a plurality of functions such as a copy function, a printing function, an image scanning function, and a facsimile function, and is also referred to as a multifunction copier. The image forming device 10 is installed in a public space and the like such as a convenience store, a supermarket, or a library on the assumption that the image forming device 10 is used by an unspecified number of users, for example. The image forming device 10 provides a plurality of services such as a copy service, a print service, a scan service, and a facsimile service by using a plurality of its functions.

The image forming device 10 includes an image scanner 12, an image former 14, and a sheet feeder 16. The image forming device 10 further includes a controller 18, an auxiliary storage 20, and a communicator 22. The image forming device 10 also includes an external storage medium communicator 24, a near field communicator 26, a code scanner 28, and a cash processor 30. The image forming device 10 further includes a photograph printer 32 and a paper piece printer 34. In addition, the image forming device 10 includes an operation display unit 36. These are connected to each other via a common bus 50.

The image scanner 12 performs an image reading process of reading an image of a document (not illustrated) and outputting read two-dimensional image data corresponding to the read image. The image scanner 12 includes a document table (not illustrated) on which a document is placed. The image scanner 12 further includes: an image reading unit including a light source, a plurality of mirrors, an imaging lens, a line sensor, and the like (not illustrated); and a driving mechanism (not illustrated) for moving an image reading position of the image reading unit. The image scanner 12 further includes a document pressing cover (not illustrated) for pressing a document placed on the document table.

The image former 14 performs image forming processing of forming an image based on appropriate image data such as the above-described scanned image data on a sheet, that is, a sheet-like image recording medium (not illustrated), and thus performs printing. The printing is performed through a known electrophotographic method for example. Thus, the image former 14 includes a photosensitive drum, a charging device, an exposure device, a developing device, a transfer device, a cleaning device, a static elimination device, a fixing device, and the like (not illustrated). The sheet (so-called printed matter) on which the printing by the image former 14 has been performed is discharged through a discharge tray (not illustrated). It should be noted that the image former 14 is not limited to the electrophotographic method, and may perform the printing based on an inkjet method, for example.

The sheet feeder 16 is an example of a sheet feeder. Specifically, the sheet feeder 16 includes one or more, generally, a plurality of sheet feeding cassettes (not illustrated). These sheet feeding cassettes store sheets of appropriate specific sizes. The sheet feeder 16 uses any one of the sheet feeding cassettes as a sheet feeding source, and feeds sheets one by one from the sheet feeding source to the image former 14. As the sheets, for example, plain paper of B5 size, A4 size, B4 size and A3 size and glossy paper of A4 size are prepared.

The controller 18 controls the entire image forming device 10. Therefore, the controller 18 includes a computer as a control executor, for example, a CPU **18*a*. In addition, the controller 18 includes a main storage 18*b* that can be directly accessed by the CPU 18*a*. The main storage 18*b* includes, for example, a ROM and a RAM which are not illustrated. Among these, the ROM stores a control program (firmware) that controls an operation of the CPU 18*a*. The RAM constitutes a work area and a buffer area for the CPU 18*a*** to execute a process based on the control program.

The auxiliary storage 20 includes, for example, a hard disk drive (not illustrated). That is, various types of data including various types of image data such as the above-described scanned image data is appropriately stored in the auxiliary storage 20. The auxiliary storage 20 may include a rewritable nonvolatile memory such as a flash memory, in place of or in addition to the hard disk drive.

The communicator 22 is connected to a communication network (not illustrated) to perform bidirectional communication over a communication network. The communication network as used herein includes a local area network (LAN), the Internet, a public switched telephone network, and the like. In addition, the LAN includes a wireless LAN (wireless LAN conforming to the IEEE 802.11 standard, so-called Wi-Fi (registered trademark)).

The external storage medium communicator 24 includes an external storage medium attachment (not illustrated) to which various types of medium as an external storage medium (not illustrated) can be attached, and performs bidirectional communication with the medium attached to the external storage medium attachment. The media as used herein includes a semiconductor medium such as an SD memory card and a USB memory, as well as a disk medium such as a CD and a DVD. The external storage medium communicator 24 further includes an infrared communicator (not illustrated) for performing, with a mobile device (not illustrated) such as a smartphone or a tablet having an infrared communication function, bidirectional communication based on the infrared communication function. Thus, the mobile device having the infrared communication function may be treated as the external storage medium.

The near field communicator 26 is an example of a near field communicator that performs bidirectional communication with a non-contact IC card (not illustrated). Therefore, the near field communicator 26 includes an IC card scanner (not illustrated). When an IC card is placed (set) on the IC card scanner, the near field communicator 26 performs near field communication with the IC card, based on a near field communication standard such as ISO/IEC_18092 (so-called NFC). Examples of the IC card as used herein include an e-money card, a basic resident registration card, an individual number card, and the like.

The code scanner 28 includes, for example, a laser scanner or a camera (not illustrated) and can scan codes attached to a product, a card, a receipt, or the like (not illustrated), using the laser scanner or the camera. The code scanner 28 can also scan a code displayed on a display of the mobile device such as the smartphone or tablet as described above. The codes that can be scanned by the code scanner 28 include a one-dimensional code (barcode) and a two-dimensional code such as a QR code (registered trademark).

The cash processor 30 performs cash settlement processing to implement cash settlement for a usage fee (charge) of the image forming device 10. Thus, the cash processor 30 includes a cash input receiver (not illustrated) for receiving an input of cash (coins and bills) and a change returner (not illustrated) for returning, when there is change, the change.

The photograph printer 32 is, for example, a sublimation printer, and performs printing, that is, so-called photographic printing, with higher quality than the image former 14. As a sheet on which the printing is performed by the photographic printer 32, for example, two types of special sheets of L size and 2 L size are prepared. These special sheets are stored in a sheet storage (not illustrated) provided in the photographic printer 32. Then, the sheet on which the photographic printing has been performed by the photograph printer 32, that is, a photograph that is printed matter is discharged through a photograph discharge port (not illustrated). The photographic printer 32 is not limited to a sublimation printer, and may be, for example, an ink jet printer (one using dye ink in particular).

The paper piece printer 34 is, for example, a thermal printer (heat sensitive printer) or a dot impact printer and performs printing on a paper piece such as a receipt. The paper piece printer 34 prints an appropriate character string, an image, or the like on roll paper (not illustrated), and discharges the paper piece as the printed matter from a discharger (not illustrated).

The operation display unit 36 is a so-called operation panel, and includes a display 36*a* as a display unit and a touch panel 36*b* as an operation receiver. The display 36*a* has a substantially rectangular display surface, and the touch panel 36*b* is provided so as to overlap the display surface of the display 36*a*. The display 36*a* is, for example, a liquid-crystal display (LCD), but is not limited thereto, and may be a display of another type such as an organic electroluminescent (EL) display. The touch panel 36*b* is, for example, a capacitive panel, but is not limited thereto, and may be a panel of another type such as an electromagnetic inductive type, a resistive film type, or an infrared type. In addition to the display 36*a*, the operation display unit 36 includes appropriate light emitting elements such as light emitting diodes (LEDs) (not illustrated). In addition to the touch panel 36*b*, the operation display unit 36 includes appropriate hardware switch elements such as push-button switches (not illustrated).

Figure 2:
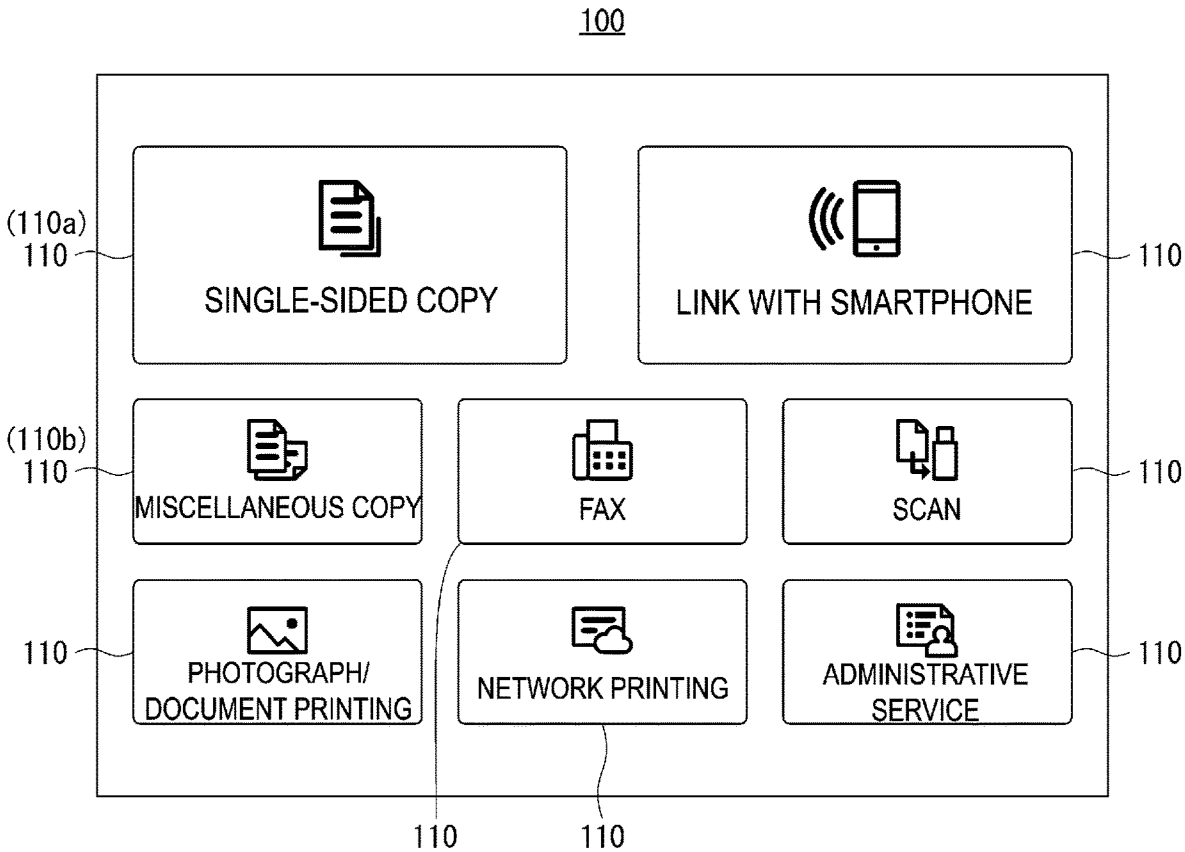
FIG. 2 is a diagram illustrating a portal screen according to an example of the disclosure.

According to the image forming device 10 of the present example, a portal screen (may also be referred to as a menu screen or a home screen) 100 as illustrated in FIG. 2 is displayed on (the display surface of) the display 36*a* after the image forming device 10 is activated. The portal screen 100 is an operation screen for freely selecting any one of services that can be provided by the image forming device 10. Therefore, on the portal screen 100, a plurality of operation keys, i.e., so-called operation keys 110, 110, . . . corresponding to the respective services that can be provided by the image forming device 10, that is, for instructing selection of each of the respective services, are appropriately arranged.

Among the operation keys 110, 110, . . . , for example, the operation key 110 arranged at an upper left side position of the portal screen 100 is a [single-sided copy] key 110*a* for instructing selection of a single-sided copy service (a service for copying an image of a document only on one main surface (one side) of a sheet) which is one of copy services. An operation key 110 arranged below and adjacent to the [single-sided copy] key 110*a* is a [miscellaneous copy] key 110*b* for instructing selection of what can be referred to as a miscellaneous copy service capable of covering various purposes such as enlarged copy and reduced copy without being limited to the single-sided copy service.

Figure 3:
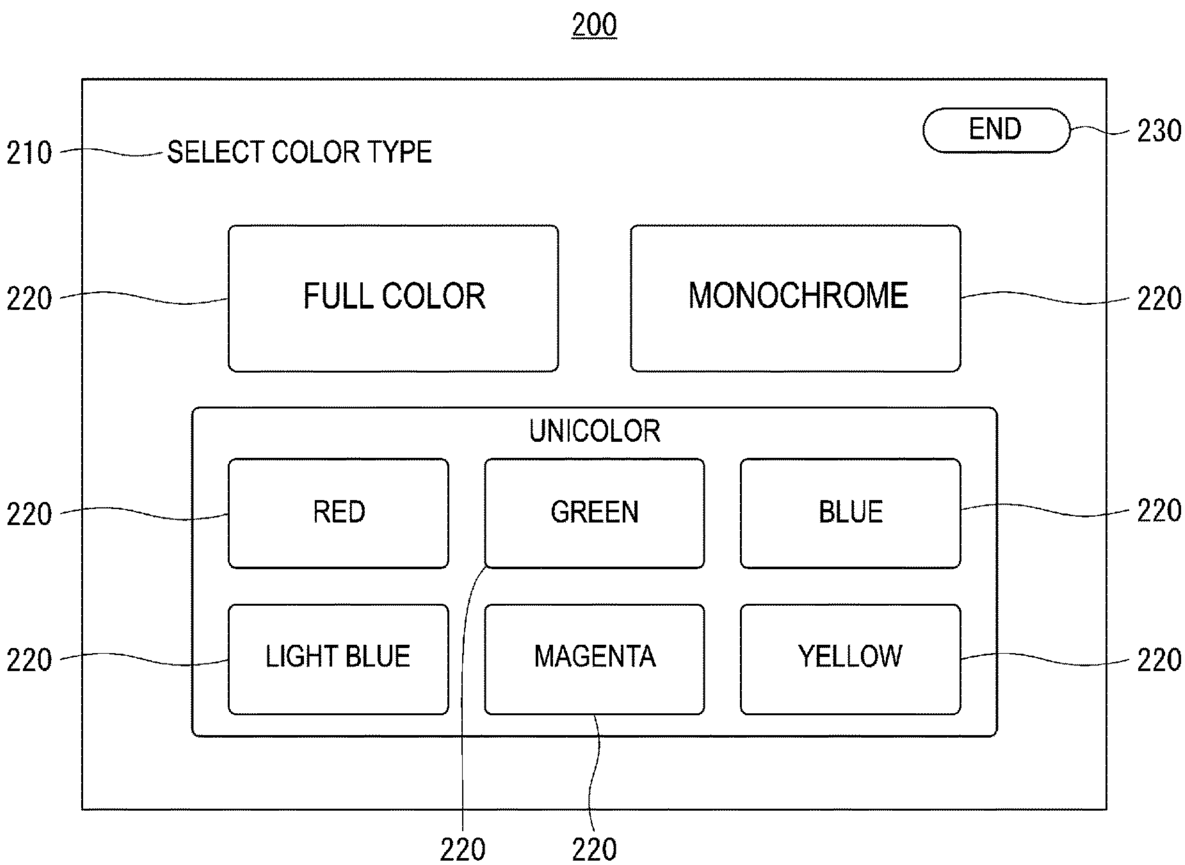
FIG. 3 is a diagram illustrating a color type selection screen according to an example of the disclosure.

On such a portal screen 100, it is assumed that, for example, the [single-sided copy] key 110*a* is operated (pressed), strictly speaking, an operation on a portion where the [single-sided copy] key 110*a* is arranged is received (detected) by the touch panel 36*b*. Then, the image forming device 10 transitions to a state for providing the single-sided copy service, that is, transitions to a so-called single-sided copy mode. Then, in place of the portal screen 100, a color type selection screen 200 as illustrated in FIG. 3 is displayed on the display 36*a*.

The color type selection screen 200 is one of operation screens for the single-sided copy service, and is an operation screen for selecting a type of a print color which is one of conditions (print conditions) for the single-sided copy service. For example, at an upper left side position of the color type selection screen 200, an appropriate character string 210 is arranged to prompt the user to select a print color type. Below the character string 210, a plurality of operation keys 220, 220, . . . for instructing selection of a print color types are appropriately arranged. Further, at a position near the upper right corner of the color type selection screen 200, for example, an [end] key 230 for forcibly ending the providing of the single-sided copy service is arranged.

Figure 4:
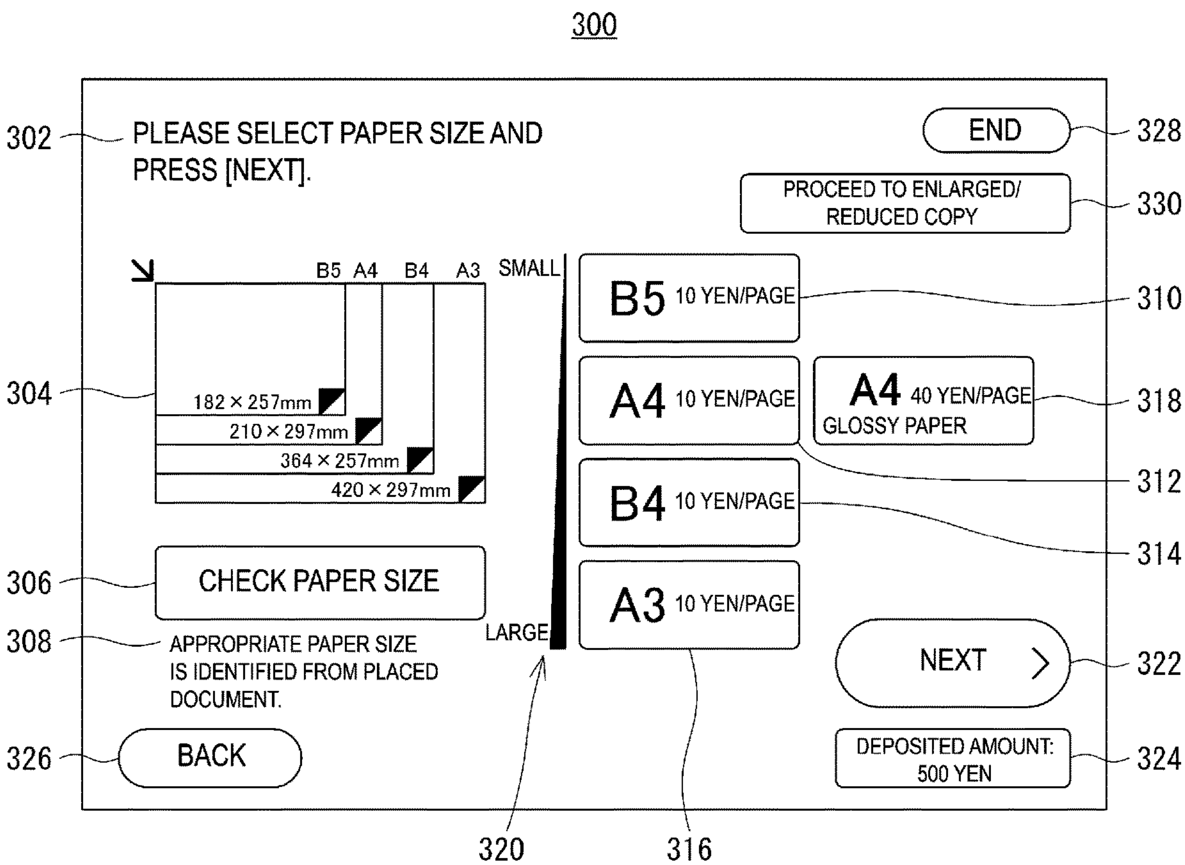
FIG. 4 is a diagram illustrating an example of a paper size selection screen according to an example of the disclosure.

When any one of the operation keys 220, 220, . . . is operated on the color type selection screen 200, the type of the print color corresponding to the operated operation key 220 is set as one of the conditions described above. Then, in place of the color type selection screen 200, a paper size selection screen 300 as illustrated in FIG. 4 is displayed on the display 36*a*. When the [end] key 230 is operated, the portal screen 100 (see FIG. 2) is displayed on the display 36*a* in place of the color type selection screen 200. In this case, the image forming device 10 transitions from the single-sided copy mode to a standby state in which the image forming device 10 waits for reception of any operation, and thus transitions to a so-called standby mode.

The paper size selection screen 300 illustrated in FIG. 4 is also one of the operation screens for the single-sided copy service, and is an operation screen for selecting a paper size which is one of the conditions for the single-sided copy service. For example, at an upper left side position of the paper size selection screen 300, an appropriate character string 302 is arranged to prompt the user to select a sheet as an output destination and to operate a [next] key 322 described below. At a position below and particularly on the left side of the character string 302, an appropriate pictorial diagram, that is, a so-called schematic diagram 304 schematically representing the appearance of each sheet prepared in the image forming device 10 is arranged. Further, a [check paper size] key 306 is arranged below the schematic diagram 304. While detailed description is omitted, the [check paper size] key 306 is an operation key for instructing designation of an optimum paper size through an optimum paper size designation function (a function of automatically designating an optimum paper size corresponding to a document size) of the image forming device 10. Below the [check paper size] key 306, an appropriate character string 308 providing a simple description for the [check paper size] key 306, in other words, the optimum paper size designation function is arranged.

On the other hand, at a position below and on the right side of the character string 302, five paper selection keys 310, 312, 314, 316, and 318 for manually selecting a size of a sheet as an output destination, strictly speaking, the sheet as the output destination are appropriately arranged. These five paper selection keys 310, 312, 314, 316, and 318 correspond to respective sheets prepared in the image forming device 10. For example, the four paper selection keys 310, 312, 314, and 316 corresponding to plain paper sheets of four sizes of B5 size, A4 size, B4 size, and A3 size are arranged in a vertical line in this order from top to bottom. On the right side of the paper selection key 312 corresponding to A4 size plain paper sheet, that is, next to the sheet selection key 312, the sheet selection key 318 corresponding to an A4 size glossy paper sheet is arranged. Further, on the left side of the area where the paper selection keys 310, 312, 314, 316, and 318 are arranged, an appropriate mark 320 indicating the relationship in size among the respective paper sizes corresponding to the paper selection keys 310, 312, 314, 316, and 318 is arranged.

In addition, near the area where the paper selection keys 310, 312, 314, 316, and 318 are arranged, for example, the [next] key 322 is arranged on the right side of and slightly below the paper selection key 316 corresponding to the A3 size paper sheet. The [next] key 322 is an operation key for instructing transition to the next operation screen from the paper size selection screen 300. Below the [next] key 322, in other words, at a position near the lower right corner of the paper size selection screen 300, a deposited amount display area 324 is arranged. The deposited amount display area 324 displays the amount of cash input (deposited amount) and currently accepted by the cash processor 30 described above. FIG. 4 illustrates an example in which the amount "500 yen" is displayed in the deposited amount display area 324.

In addition, a [return] key 326 is arranged at a position near the lower left corner of the paper size selection screen 300. The [return] key 326 is an operation key for instructing restoration of the state before the paper size selection screen 300 is displayed. Then, at a position near the upper right corner of the paper size selection screen 300, for example, an [end] key 328 similar to the [end] key 320 on the color type selection screen 200 is arranged. Below the [end] key 328, a [proceed to enlarged/reduced copy] key 330 is arranged. The [proceed to enlarged/reduced copy] key 330 is an operation key for instructing execution of enlarged copy or reduced copy.

On the paper size selection screen 300, when the [check paper size] key 306 is operated and the optimum paper size is designated by the above-described optimum paper size designation function, the designated paper size is automatically selected. When one of the paper selection keys 310, 312, 314, 316, and 318 is operated, the paper size, strictly speaking, the sheet corresponding to the operated sheet selection key 310, 312, 314, 316, or 318 is selected. Then, when the [next] key 322 is operated, the paper size, or strictly speaking, the sheet selected is set as one of the above-described conditions. Then, in place of the paper size selection screen 300, a document reading operation screen 400 as illustrated in FIG. 5 is displayed on the display 36*a*.

When the [return] key 326 is operated, the state before the paper size selection screen 300 is displayed is restored. Specifically, in place of the paper size selection screen 300, the color type selection screen 200 (see FIG. 3) is displayed on the display 36*a*. When the [end] key 328 is operated, the providing of the single-sided copy service is forcibly ended, that is, the portal screen 100 (see FIG. 2) is displayed on the display 36*a* in place of the paper size selection screen 300. Then, the image forming device 10 transitions from the single-sided copy mode to the standby mode. A case where the [proceed to enlarged/reduced copy] key 330 is operated will be described later.

Figure 5:
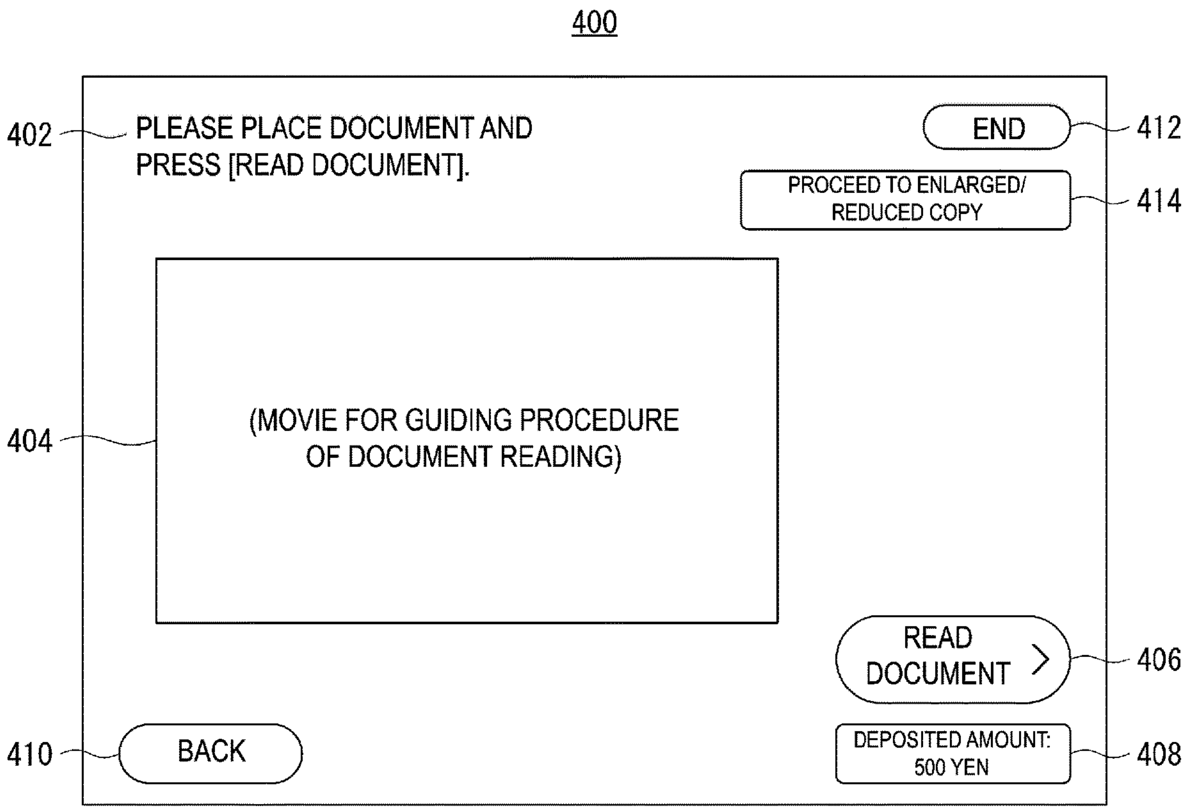
FIG. 5 is a diagram illustrating an example of a document reading operation screen according to an example of the disclosure.

The document reading operation screen 400 illustrated in FIG. 5 is also one of operation screens for the single-sided copy service, and is an operation screen for instructing execution of copying through the single-sided copy service. At an upper left side position of the document reading operation screen 400, for example, an appropriate character string 402 to prompt the user to operate a [document reading] key 406, which will be described below, after placing a document on the document table is arranged. At a position below and, strictly speaking, slightly on the left side of the character string 402, a rectangular movie display area 404 is arranged. The movie display area 404 displays an appropriate movie (not illustrated) for guiding an operation procedure in which a document is placed on the document table and then the [document reading] key 406 to be described next is operated. Near the movie display area 404, for example, on the right side of and slightly below the movie display area 404, the [document reading] key 406 is arranged. The [document reading] key 406 is an operation key for instructing the start of copying. Note that a deposited amount display area 408, a [return] key 410, an [end] key 410, and an [proceed to enlarged/reduced copy] key 414 similar to those on the paper size selection screen 300 (see FIG. 4) are also arranged on the document reading operation screen 400.

In a state where the document reading operation screen 400 is displayed, when a document is placed on the document table and the [document reading] key 406 is operated as in the movie displayed in the movie display area 404, copying (single-sided copying) starts, that is, copying including image scanning processing by the image scanner 12 and image forming processing by the image former 14 starts. This copying is performed in accordance with the above-described conditions set thus far. While the copying is in progress, a copy-in-progress screen (not illustrated) indicating that the copying is in progress is displayed on the display 36*a* in place of the document reading operation screen 400. When the copying ends, a service continuation confirmation screen 500 as illustrated in FIG. 6 is displayed on the display 36*a* in place of the copy-in-progress screen.

When the [return] key 410 is operated on the document reading operation screen 400, the state before the document reading operation screen 400 is displayed is restored. Specifically, in place of the document reading operation screen 400, the paper size selection screen 300 (see FIG. 4) is displayed on the display 36*a*. When the [end] key 412 is operated, the provision of the single-sided copy service is forcibly ended, that is, the portal screen 100 (see FIG. 2) is displayed on the display 36*a* in place of the document reading operation screen 400. Then, the image forming device 10 transitions from the single-sided copy mode to the standby mode. A case where the [proceed to enlarged/reduced copy] key 414 is operated will be described later. FIG. 5 illustrates an example in which the amount "500 yen" is displayed in the deposited amount display area 408.

Figure 6:
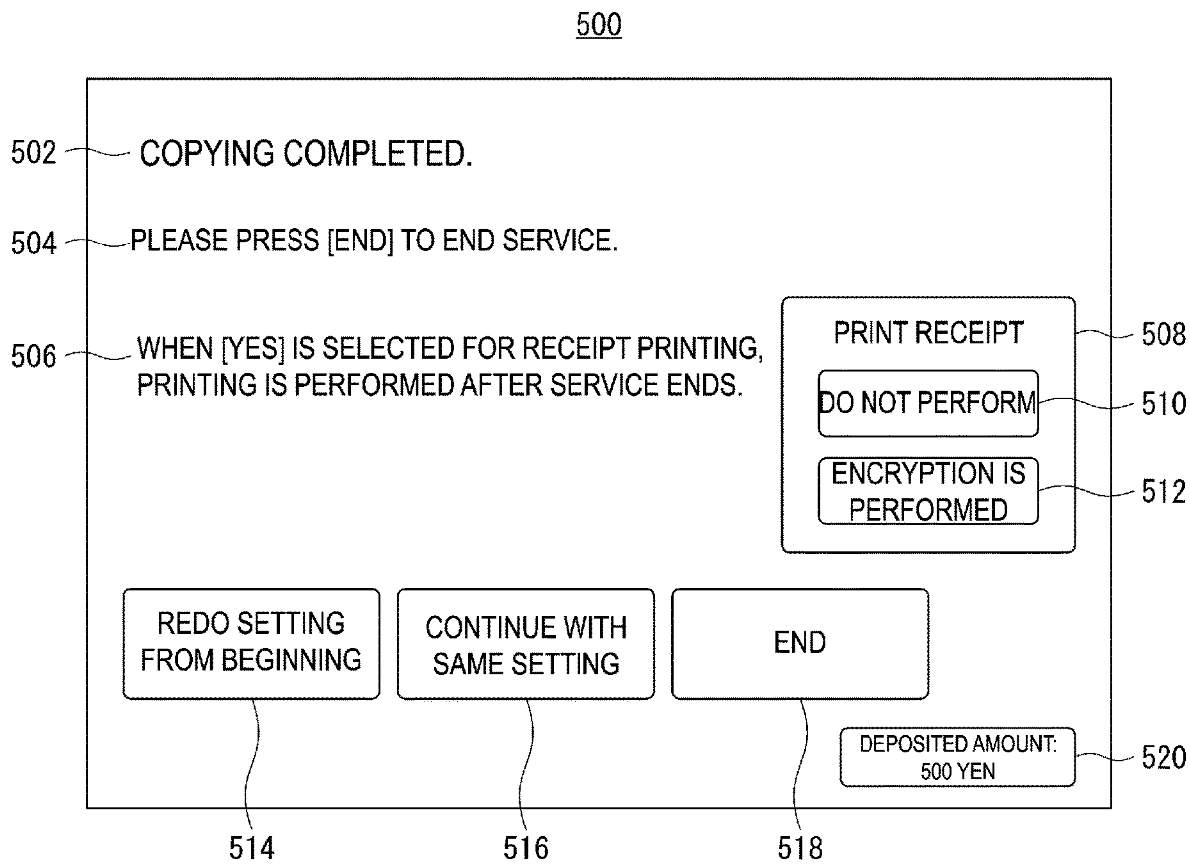
FIG. 6 is a diagram illustrating an example of a service continuation confirmation screen according to an example of the disclosure.

The service continuation confirmation screen 500 illustrated in FIG. 6 is also one of the operation screens for the single-sided copy service, and is an operation screen for checking with (asking) the user whether the provision of the single-sided copy service is to be continued when the provision of the single-sided copy service ends. At an upper left side position of the service continuation confirmation screen 500, for example, an appropriate character string 502 indicating that copying has ended (completed) is arranged. Below the character string 502, an appropriate character string 504 is arranged to guide the user to operate an [end] key 518 to be described below in order to end the provision of the service (single-sided copy service). Furthermore, below the character string 504, an appropriate character string 506 indicating that a receipt is printed (issued) after the provision of the service ends, if a [yes] key 512 and the [end] key 518 in a receipt print setting area 508 described next are operated.

The receipt print setting area 508 is arranged on the right side of the character string 506. In the receipt print setting area 508, two operation keys that are a [no] key 510 and the [yes] key 512 are vertically arranged in this order from the top to the bottom. The [no] key 510 is an operation key for instructing not to print a receipt. The [yes] key 512 is an operation key for instructing printing of a receipt.

Further, at a position below and, strictly speaking, on the slightly left side of the receipt print setting area 508, a [redo setting from beginning] key 514, a [continue with same setting] key 516, and the [end] key 518 are arranged side by side in this order from the left side to the right side, in particular arranged adjacent to each other. The [redo setting from beginning] key 514 arranged at the left end is an operation key for instructing display of the color type selection screen 200 (see FIG. 3), which is the first operation screen for the single-sided copy service, on the display 36*a* in place of the service continuation confirmation screen 500. The [continue with same setting] key 516 arranged at the center is an operation key for instructing display of the document reading operation screen 400 (see FIG. 5) on the display 36*a* in place of the service continuation confirmation screen 500, that is, to continue copying under the conditions that are the same as those currently set. The [end] key 518 arranged at the right end is an operation key for instructing the end the provision of the single-sided copy service. Also on the service continuation confirmation screen 500 as well, a deposited amount display area 520 similar to that on the document reading operation screen 400 or the like is arranged.

When, for example, the [redo setting from beginning] key 514 is operated on the service continuation confirmation screen 500, the color type selection screen 200 (see FIG. 3) which is the first operation screen for the single-sided copy service (that is, the destination of transition in response to an operation on the [single-sided copy] key 110*a* on the portal screen 100) is displayed on the display 36*a* in place of the service continuation confirmation screen 500. That is, the image forming device 10 transitions to a state in which the conditions for the single-sided copy service can be set again from the beginning without ending the provision of the single-sided copy service, in other words, without transitioning from the single-sided copy mode, that is, without returning to the state in which the portal screen 100 is displayed on the display 36*a*.

When the [continue with same setting] key 516 is operated, the document reading operation screen 400 (see FIG. 5) is displayed on the display 36*a* in place of the service continuation confirmation screen 500. Specifically, the image forming device 10 transitions to a state in which copying can be continued under the conditions that are the same as those currently set, without ending the provision of the single-sided copy service.

When the [end] key 518 is operated, strictly speaking, for example, when the [no] key 510 on the receipt print setting area 508 is operated and then the [end] key 518 is operated, an appropriate service end screen (not illustrated) (an example of a third screen) indicating that the provision of the single-sided copy service is ended is displayed on the display 36*a* for a predetermined period of time in place of the service continuation confirmation screen 500. The predetermined period of time as used herein which varies depending on the service is, for example, 20 seconds in the case of the single-sided copy service. The service end screen includes an appropriate message to warn the user not to forget to take the document and the like. In parallel with the displaying of the service end screen on the display 36*a*, an appropriate voice message may be output to warn the user not to forget to take the document and the like. Then, when the predetermined period of time elapses, the portal screen 100 (see FIG. 2) is displayed on the display 36*a* in place of the service end screen. Then, the image forming device 10 transitions from the single-sided copy mode to the standby mode.

On the other hand, when the [end] key 518 is operated after the [yes] key 512 on the receipt print setting area 508 is operated, particularly when the single-sided copy service is provided only once (i.e., only for one page of document), a service end screen (not illustrated) (an example of the third screen) is displayed on the display 36*a* for the predetermined period of time in place of the service continuation confirmation screen 500, as in the case where the [no] key 510 in the receipt print setting area 508 described above is operated and the [end] key 518 is operated. At the same time, a receipt related to the provision of the single-sided copy service is printed by the paper piece printer 34 (see FIG. 1). Then, when the predetermined period of time elapses, the portal screen 100 (see FIG. 2) is displayed on the display 36*a* in place of the service end screen (an example of the third screen). Then, the image forming device 10 transitions from the single-sided copy mode to the standby mode.

Figure 7:
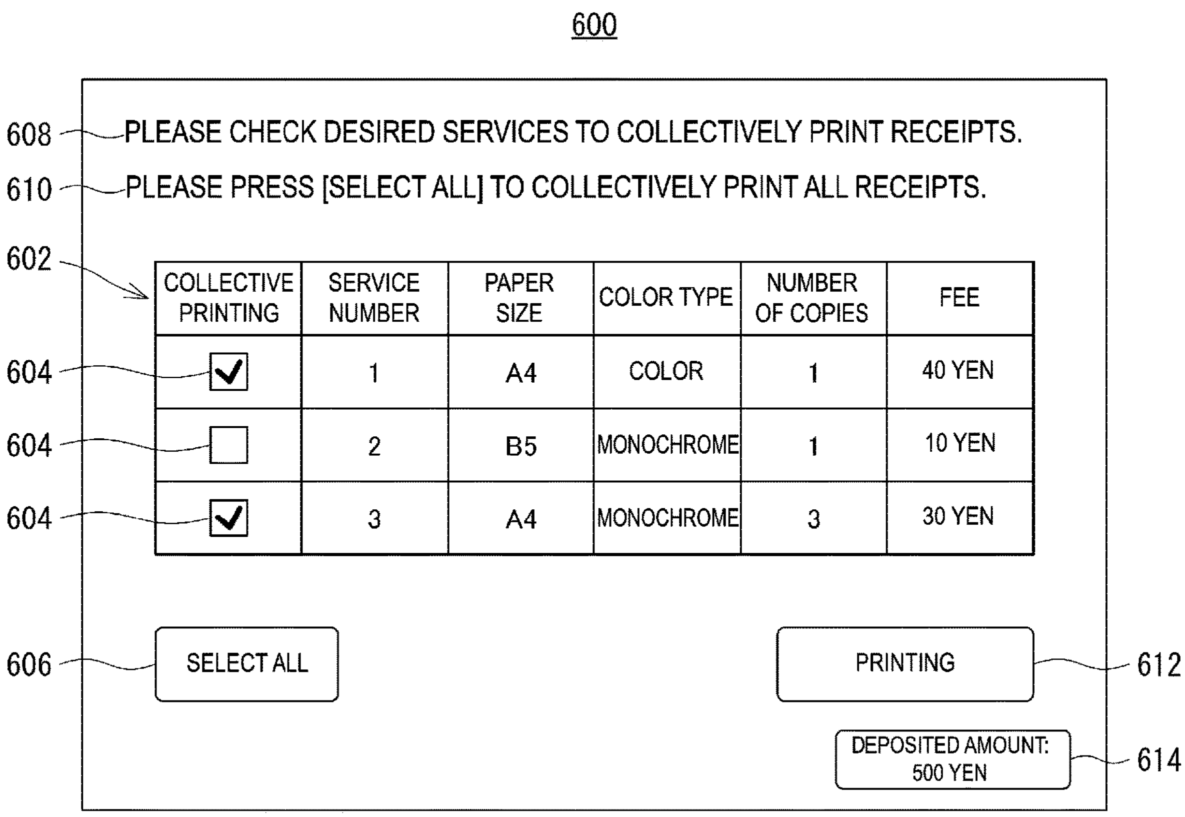
FIG. 7 is a diagram illustrating an example of a receipt setting screen according to an example of the disclosure.

Further, when the [yes] key 512 in the receipt print setting area 508 is operated and the [end] key 518 is operated, and the single-sided copy service is provided a plurality of times (i.e., for a document having a plurality of pages), a receipt setting screen 600 (another example of the third screen) as illustrated in FIG. 7 is displayed on the display 36*a* in place of the service continuation confirmation screen 500. The receipt setting screen 600 is a screen for setting in which form the receipts related to the single-sided copy service provided a plurality of times are printed.

At substantially the center of the receipt setting screen 600, for example, a list 602 indicating the contents of the single-sided copy service provided a plurality of times is arranged. The list 602 displays the number of each single-sided copy service provided (for example, a serial number with an initial value being “1”), the paper size, the print color type, the number of printed sheets, and the fee. Furthermore, in the list 602, more specifically, in a left side portion of the list 602, check boxes 604, 604, . . . for selecting services (single-sided copy service) for which the receipts are desired to be collectively printed are provided. Note that the list 602 in FIG. 7 is an example of a case where the single-sided copy service is performed three times. FIG. 7 illustrates an example in which two check boxes 604, 604, . . . corresponding to two services with the service numbers “1” and “3” are checked, that is, an example in which a selection is made to collectively print the receipts related to the two services. The information (items) displayed in the list 602 is merely an example, and other types of information may be displayed in the list 602.

Further, below the list 602, more specifically below the check boxes 604, 604, . . . arranged side by side, a [select all] key 606 is arranged for instructing checking of all the check boxes 604, 604, . . . , that is, for instructing selection of the receipts for all the services displayed in the list 602 as the target of collective printing. In other words, when the [select all] key 606 is operated, all the check boxes 604, 604, . . . are checked, that is, selection is made to collectively print the receipts for all the services displayed in the list 602.

Above the receipt setting screen 600, an appropriate character string 608 notifying the user of the fact that he or she has to check the check boxes 604 corresponding to the desired services, when the receipts are to be collectively printed. Below the character string 608, an appropriate character string 610 is arranged to notify the user of the fact that he or she only needs to operate the [select all] key 606 for collectively printing the receipts for all the services.

A [print] key 612 is arranged at a position below, and specifically on the right side of the list 602. The [print] key 612 is an operation key for instructing the start of printing of the receipt by the paper piece printer 34. Below the [print] key 612, in other words, at a position near the lower right corner of the receipt setting screen 600, a deposited amount display area 614 similar to that on the service continuation confirmation screen 500 or the like is arranged.

Figure 8:
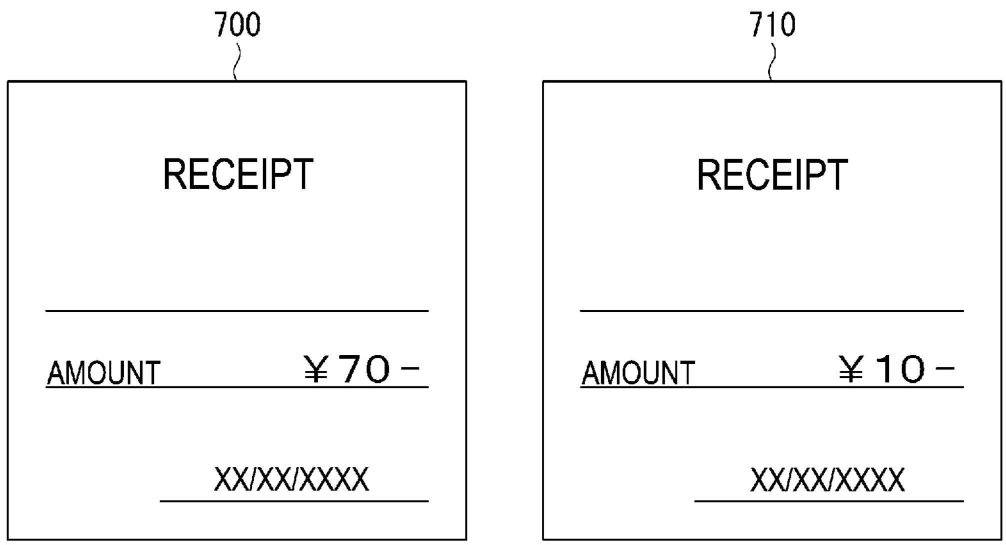
FIG. 8 is a diagram illustrating an example of a receipt according to one example of the disclosure.

In the state illustrated in FIG. 7, when the [print] key 612 is operated, printing of the receipt by the paper piece printer 34 starts. As a result, two receipts 700 and 710 as illustrated in FIG. 8 are printed. The receipt 700 which is one of these (on the left side) is obtained by collectively printing the receipts for the two services with the numbers "1" and "3" in the list 602 described above on a single sheet. The other receipt 710 (one the right side) corresponds to the remaining service in the list 602, that is, the service with the service number "2" alone.

When the [print] key 612 is operated on the receipt setting screen 600 without checking any of the check boxes 604, 604, . . . in the list 602, the receipts respectively corresponding to all the services displayed in the list 602 are individually printed, instead of collectively printing the receipts for the services. In the configuration of the receipt setting screen 600 illustrated in FIG. 7, a single receipt can be provided for only one set of services, but the receipt setting screen 600 may be configured to enable a single receipt to be provided for a plurality of sets.

Figure 9:
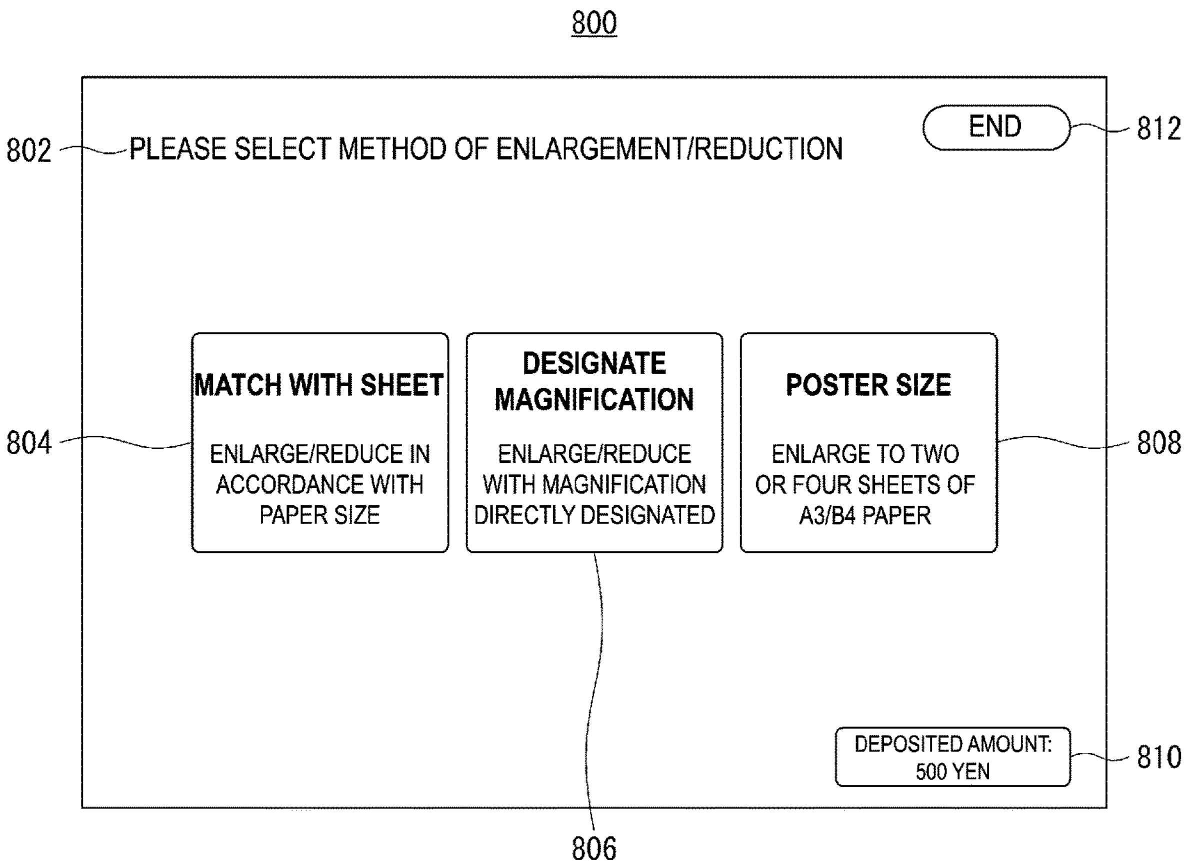
FIG. 9 is a diagram illustrating an example of an enlargement/reduction setting screen according to an example of the disclosure.

For example, when the [proceed to enlarged/reduced copy] key 330 is operated on the paper size selection screen 300 (FIG. 4) described above, an enlargement/reduction setting screen 800 as illustrated in FIG. 9 is displayed on the display 36*a* in place of the paper size selection screen 300. The enlargement/reduction setting screen 800 is an operation screen for setting a procedure for enlarged copy or reduced copy to be performed. It should be noted that the enlargement/reduction setting screen 800 is not an operation screen related to the above-described single-sided copy service (what can be referred to as a currently provided service A) and is one of operation screens related to the above-described miscellaneous copy service (what can be referred to as another service B). That is, when the [proceed to enlarged/reduced copy] key 330 on the paper size selection screen 300 is operated, the image forming device 10 transitions from the single-sided copy mode (what can be referred to as a mode A) to a state for providing miscellaneous copy services, that is, the image forming device 10 transitions to what can be referred to as a miscellaneous copy mode (what can be referred to as a mode B).

For example, at an upper left side position of the enlargement/reduction setting screen 800, an appropriate character string 802 is arranged to prompt the user to select the procedure (method) of the enlarged copy or reduced copy. Below the character string 802, in other words, substantially at the center of the enlargement/reduction setting screen 800, three operation keys that are a [match with sheet] key 804, a [designate magnification] key 806, and a [poster size] key 808 are arranged side by side in this order from the left side to the right side, in particular, arranged adjacent to each other. While detailed description of the enlargement/reduction setting screen 800 including the [match with sheet] key 804, the [designate magnification] key 806, and the [poster size] key 808 is omitted, with the enlargement/reduction setting screen 800, the procedure of the enlarged copy or reduced copy can be selected. Furthermore, it is possible to transition from this screen to a screen on which the procedure of the enlarged copy or the reduced copy can be set in detail. Also on the enlargement/reduction setting screen 800, a deposited amount display area 810 and an [end] key 812 similar to those on the paper size selection screen 300 and the like are arranged.

Similarly, also when the [proceed to enlarged/reduced copy] key 414 is operated on the document reading operation screen 400 (FIG. 5) described above, the enlargement/reduction setting screen 800 is displayed on the display 36*a* in place of the document reading operation screen 400. Then, the image forming device 10 transitions from the single-sided copy mode to the miscellaneous copy mode.

Figure 10:
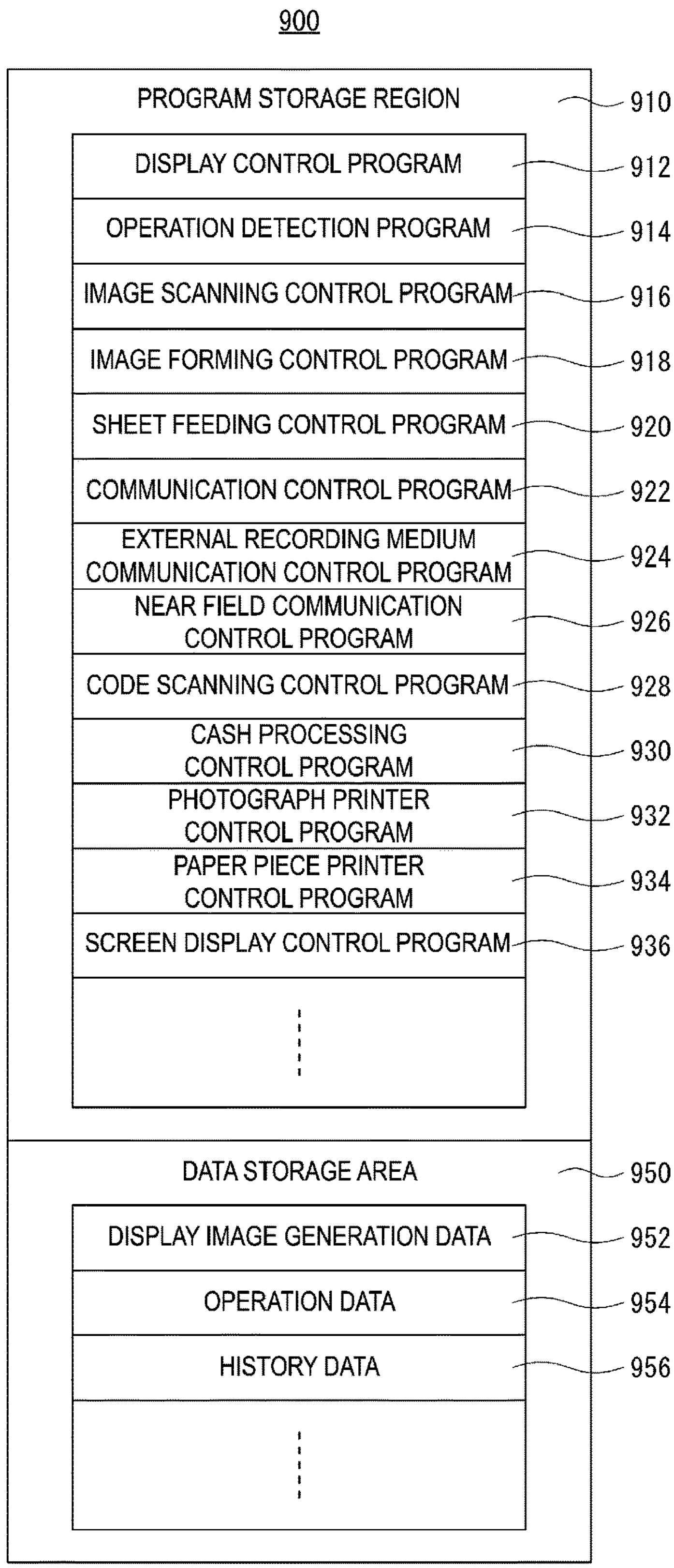
FIG. 10 is a memory map conceptually illustrating a configuration in a RAM of a main storage according to an example of the disclosure.

FIG. 10 illustrates a memory map 900 conceptually illustrating the internal configuration of the RAM of the main storage 18*b* (see FIG. 1).

As illustrated in the memory map 900, the RAM includes a program storage area 910 and a data storage area 950. The program storage area 910 stores the control program described above. Specifically, the control program includes a display control program 912, an operation detection program 914, an image scanning control program 916, an image forming control program 918, and a sheet feeding control program 920. The control program includes a communication control program 922, an external storage medium communication control program 924, a near field communication control program 926, a code scanning control program 928, and a cash processing control program 930. The control program further includes a photograph printer control program 932 and a paper piece printer control program 934. The control program further includes a screen display control program 936.

The display control program 912 is a program for generating display screen data necessary for displaying, on the display 36*a*, various screens including the portal screen 100. The operation detection program 914 is a program for detecting a state of operation on the touch panel 36*b*. The image scanning control program 916 is a program for controlling the image scanner 12. The image forming control program 918 is a program for controlling the image former 14. The sheet feeding control program 920 is a program for controlling the sheet feeder 16. The communication control program 922 is a program for controlling the communicator 22. The external storage medium communication control program 924 is a program for controlling the external storage medium communicator 24. The near field communication control program 926 is a program for controlling the near field communicator 26. The code scanning control program 928 is a program for controlling the code scanner 28. The cash processing control program 930 is a program for controlling the cash processor 30. The photograph printer control program 932 is a program for controlling the photograph printer 32. The paper piece printer control program 934 is a program for controlling the paper piece printer 34. The screen display control program 936 is a program for causing the CPU 18*a* to execute a screen display control task to be described below. The display control program 912 is stored in the main storage 18*b* which is a non-transitory computer-readable recording medium such as a ROM for example.

On the other hand, the data storage area 950 stores various types of data. The various types of data include display image generation data 952, operation data 954, history data 956, and the like.

The display image generation data 952 is data such as polygon data and texture data used to generate display screen data based on the display control program 912 described above. The operation data 954 indicates a state of an operation on the touch panel 36*b*, and more specifically, is time-series data representing a touch position (coordinates) of the user on the touch panel 36*b*. The history data 956 is data indicating a record at a point when services such as the above-described single-sided copy service are provided. The list 602 on the receipt setting screen 600 described above (FIG. 7) is configured based on the history data 956.

Figure 11:
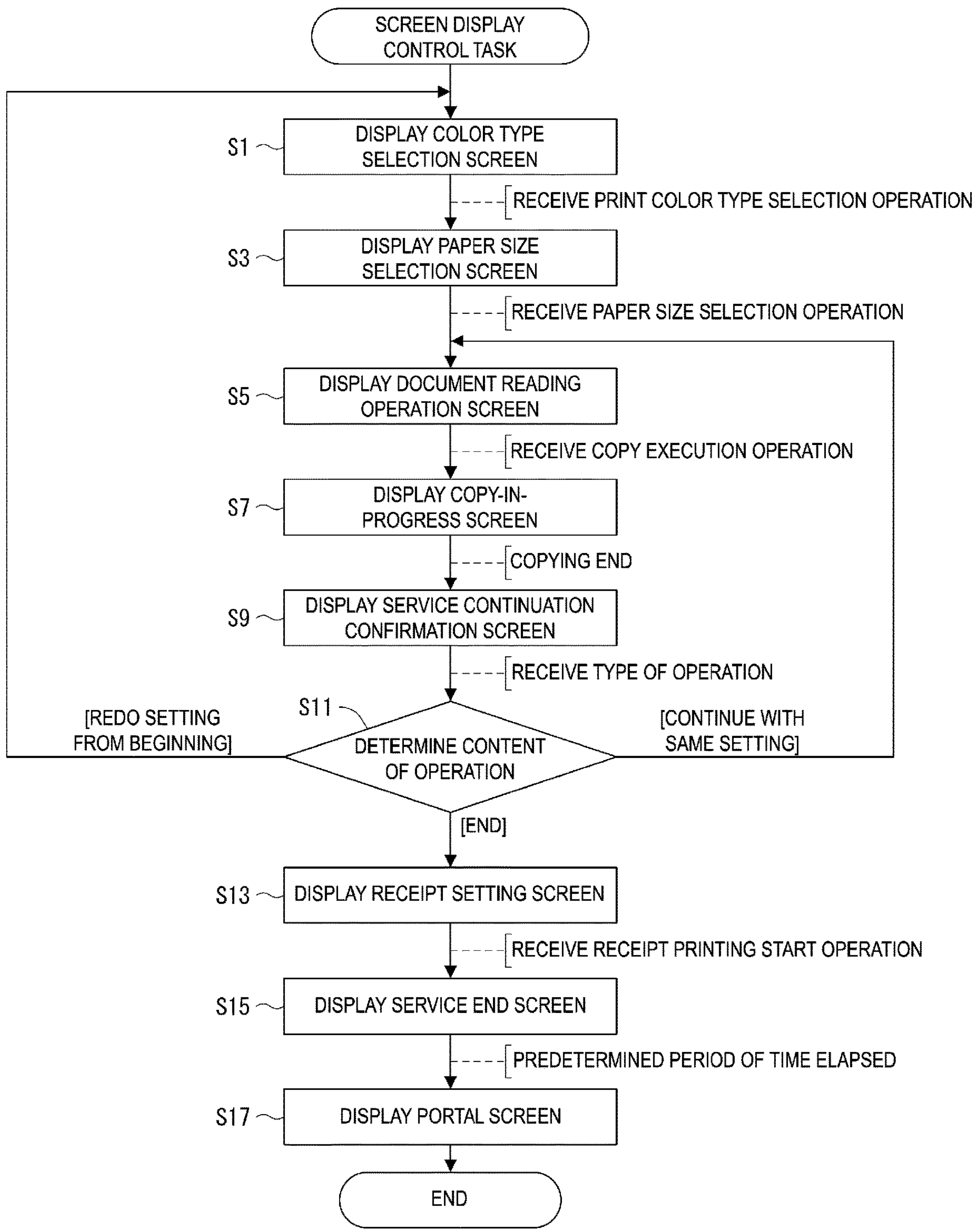
FIG. 11 is a flowchart illustrating a flow of a screen display control task according to an example of the disclosure.

As described above, for example, when the [single-sided copy] key 110*a* is operated on the portal screen 100, the image forming device 10 transitions to the single-sided copy mode. Then, a plurality of operation screens that are the color type selection screen 200, the paper size selection screen 300, the document reading operation screen 400, the copy-in-progress screen (not illustrated), and the service continuation confirmation screen 500 are displayed one by one in this order on the display 36*a*. When any of the [redo setting from beginning] key 514, the [continue with same setting] key 516, and the [end] key 518 is operated on the service continuation confirmation screen 500, the state of the image forming device 10 transitions to the destination of the transition corresponding to the operation. When the state of the image forming device 10 thus transitions, the CPU 18*a* executes the screen display control task in accordance with the screen display control program 936. FIG. 11 illustrates a flow of the screen display control task. FIG. 11 illustrates a flow of the screen display control task in the single-sided copy service, in other words, in the single-sided copy mode. The screen display control task illustrated in FIG. 11 is executed when the [single-sided copy] key 110*a* is operated on the portal screen 100.

According to the screen display control task, first, in step S1, the CPU 18*a* displays the color type selection screen 200 on a display 36*a* in place of the portal screen 100. When any one of the operation keys 220, 220, . . . is operated on the color type selection screen 200, that is, when an operation for selecting any print color type is received, the CPU 18*a* causes the processing to proceed to step S3.

In step S3, the CPU 18*a* displays the paper size selection screen 300 on the display 36*a* in place of the color type selection screen 200. When any paper size is selected on the paper size selection screen 300 and the [next] key 322 is operated, that is, when an operation for selecting (setting) a paper size is received, the CPU 18*a* causes the processing to proceed to step S5.

In step S5, the CPU 18*a* displays the document reading operation screen 400 on the display 36*a* in place of the paper size selection screen 300. When the [document reading] key 406 is operated on the document reading operation screen 400, that is, when an operation for instructing execution of copy (single-sided copy) is received, the CPU 18*a* causes the processing to proceed to step S7.

In step S7, the CPU 18*a* displays the copy-in-progress screen on the display 36*a* in place of the document reading operation screen 400. At the same time, copying starts. This copying is executed in accordance with a task different from the screen display control task. Then, when the copying ends, the CPU 18*a* causes the processing to proceed to step S9.

In step S9, the CPU 18*a* displays the service continuation confirmation screen 500 on the display 36*a* in place of the copy-in-progress screen. When any operation is accepted on the service continuation confirmation screen 500, the CPU 18*a* causes the processing to proceed to step S11.

In step S11, the CPU 18*a* determines the content of the operation accepted in step S9 described above. Here, for example, when the [redo setting from beginning] key 514 is operated on the service continuation confirmation screen 500, the CPU 18*a* causes the processing to return to step S1. As a result, the color type selection screen 200 is displayed on the display 36*a* in place of the service continuation confirmation screen 500. When the [continue with same setting] key 516 is operated on the service continuation confirmation screen 500, the CPU 18*a* causes the processing to return to step S5. As a result, the document reading operation screen 400 is displayed on the display 36*a* in place of the service continuation confirmation screen 500. Further, when the [end] key 518 is operated on the service continuation confirmation screen 500, particularly when the [yes] key 512 and the [end] key 518 are operated on the receipt print setting area 508, and when the single-sided copy service is provided a plurality of times for example, the CPU 18*a* causes the processing to proceed to step S13.

In step S13, the CPU 18*a* displays the receipt setting screen 600 (another example of the third screen) on the display 36*a* in place of the service continuation confirmation screen 500. When the [print] key 612 is operated on the receipt setting screen 600, the CPU 18*a* causes the processing to proceed to step S15. At this time, the receipt is printed. The printing of the receipt is performed in accordance with a task different from the screen display control task.

Although not illustrated in the drawings, when the [no] key 510 in the receipt print setting area 508 on the service continuation confirmation screen 500 is operated and then the [end] key 518 on the service continuation confirmation screen 500 is operated in step S11 described above, the CPU 18*a* skips step S13 and causes the processing to proceed to step S15. In this case, no receipt is printed. The CPU 18*a* similarly skips step S13 and causes the processing to proceed to step S15, when the [yes] key 512 in the receipt print setting area 508 on the service continuation confirmation screen 500 is operated and then the [end] key 518 is operated in step S11 and when the single-sided copy service is provided only once. In this case, a receipt is printed.

In step S15, when the receipt setting screen 600 has been displayed at an immediately preceding timing, the CPU 18*a* displays, for example, the service end screen on the display 36*a* in place of the receipt setting screen 600. Alternatively, in step S15, when the service continuation confirmation screen 500 has been displayed at an immediately preceding timing, the CPU 18*a* displays the service end screen on the display 36*a* in place of the service continuation confirmation screen 500. Then, when the predetermined period of time described above elapses, the CPU 18*a* causes the processing to proceed to step S17.

In step S17, the CPU 18*a* displays the portal screen 100 on the display 36*a* in place of the service end screen. Thus, the CPU 18*a* ends the screen display control task.

Although not illustrated in the drawings, when the [proceed to enlarged/reduced copy] key 330 on the paper size selection screen 300 is operated in the above-described step S3, the CPU 18*a* causes the processing to proceed to a step of displaying the enlargement/reduction setting screen 800 on the display 36*a* in place of the paper size selection screen 300. Similarly, in step S5, when the [proceed to enlarged/reduced copy] key 414 on the document reading operation screen 400 is operated, the CPU 18*a* causes the processing to proceed to a step of displaying the enlargement/reduction setting screen 800 on the display 36*a* in place of the document reading operation screen 400.

Figure 12:
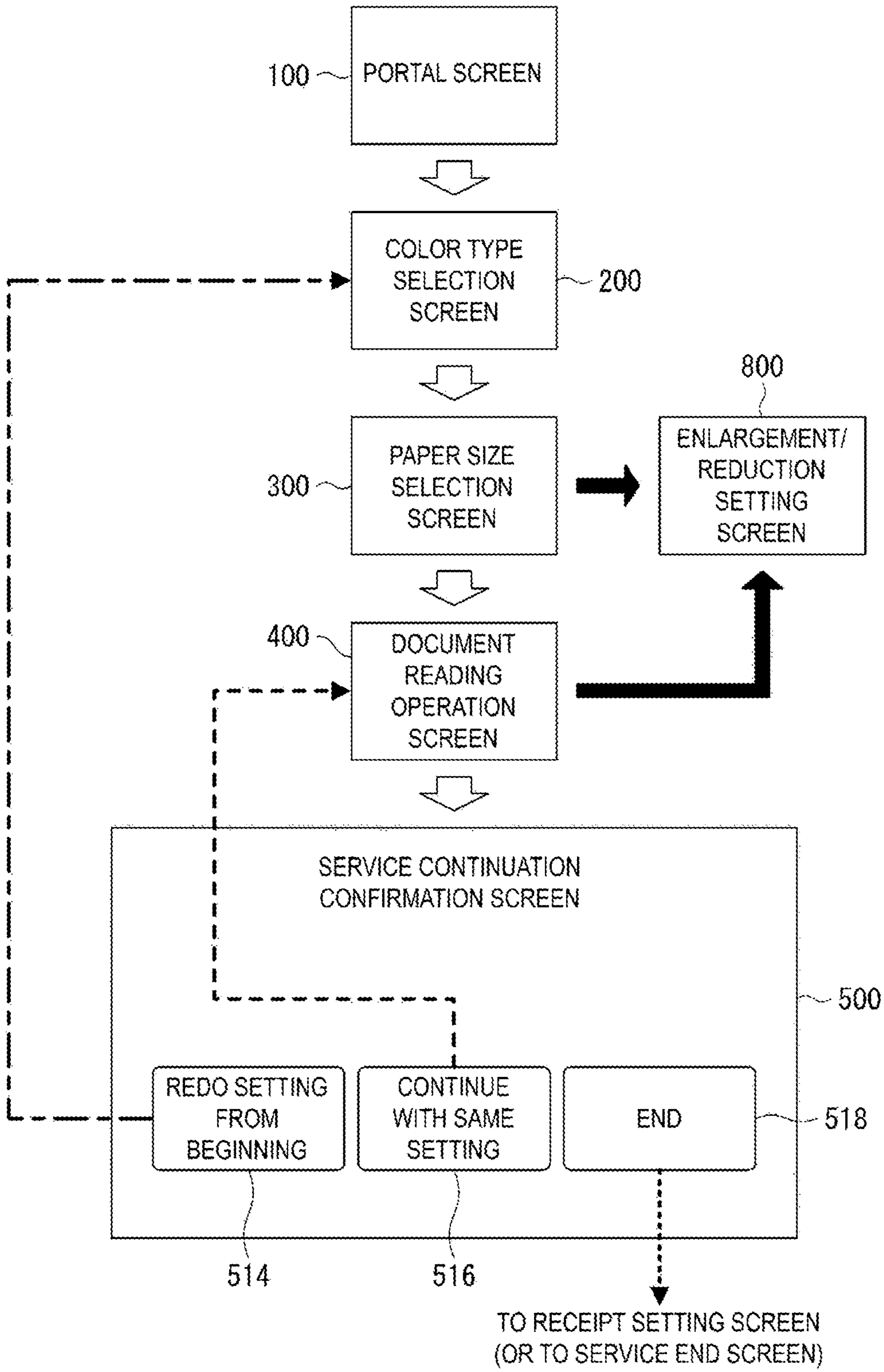
FIG. 12 is a diagram illustrating a transition state of a display screen according to an example of the disclosure.

FIG. 12 illustrates a state of transition of the screen displayed on the display 36*a* in the single-sided copy service, and particularly illustrates a transition state until the service continuation confirmation screen 500 is displayed on the display 36*a*. As indicated by white arrows in FIG. 12, with the single-sided copy service, the state in which the portal screen 100 is displayed on the display 36*a* transitions to the state in which the color type selection screen 200, the paper size selection screen 300, the document reading operation screen 400, and the copy-in-progress screen (not illustrated) are displayed one by one in this order on the display 36*a*, and then transitions to the state in which the service continuation confirmation screen 500 is displayed on the display 36*a*.

When the [redo setting from beginning] key 514 is operated on the service continuation confirmation screen 500, the transition to the color type selection screen 200 is displayed on the display 36*a* occurs as indicated by a dash-dotted line arrow in FIG. 12. When the [continue with same setting] key 516 is operated on the service continuation confirmation screen 500, as indicated by a long dashed line arrow in FIG. 12, transition to the state in which the document reading operation screen 400 is displayed on the display 36*a* occurs. Further, when the [end] key 518 is operated on the service continuation confirmation screen 500, as indicated by a short dashed line arrow in FIG. 12, transition to the state in which the receipt setting screen 600 or the service end screen is displayed on the display 36*a* occurs.

When the [proceed to enlarged/reduced copy] key 330 on the paper size selection screen 300 is operated, or when [proceed to enlarged/reduced copy] key 414 on the document reading operation screen 400 is operated, as indicated by a black arrow in FIG. 12, transition to the state in which the enlargement/reduction setting screen 800 is displayed on the display 36*a* occurs.

As described above, according to the present example, the service continuation confirmation screen 500 displayed when the provision of the single-sided copy service ends is provided with a plurality of operation keys including the [redo setting from beginning] key 514 and the [continue with same setting] key 516. In particular, when the [redo setting from beginning] key 514 is operated, the image forming device 10 transitions to a state for setting the conditions for the single-sided copy service again from the beginning. Thus, the user can enjoy the single-sided copy service provided after appropriately setting the conditions for the single-sided copy service again. When the [continue with same setting] key 516 is operated, the image forming device 10 transitions to the state in which the single-sided copy service is provided under the conditions that are the same as those currently set, and thus the user can enjoy the single-sided copy service provided under the same conditions as those currently set. This reduces (simplifies) the time and effort the user's operation takes and further improves the operability of the image forming device 10.

The [redo setting from beginning] key 514 and the [continue with same setting] key 516 as well as the [end] key 518 are arranged adjacent to each other. As a result, the user can see the [redo setting from beginning] key 514, the [continue with same setting] key 516, and the [end] key 518 with improved visibility. This further contributes to improvement in the operability of the image forming device 10.

When the [proceed to enlarged/reduced copy] key 330 on the paper size selection screen 300 is operated, or when the [proceed to enlarged/reduced copy] key 414 on the document reading operation screen 400 is operated, transition to the state in which the enlargement/reduction setting screen 800 is displayed on the display 36*a* occurs, and thus the image forming device 10 transitions from the single-sided copy mode to the miscellaneous copy mode. Thus, the image forming device 10 can transition from the single-sided copy mode to the miscellaneous copy mode without returning from the single-sided copy mode to the state in which the portal screen 100 is displayed on the display 36*a*. This is an advantageous effect achieved with the [redo setting from beginning] key 514 and the [continue with same setting] key 516, particularly, with the [redo setting from beginning] key 514 provided on the service continuation confirmation screen 500. In other words, by providing the [redo setting from beginning] key 514 on the service continuation confirmation screen 500, the [proceed to enlarged/reduced copy] key 330 on the paper size selection screen 300 becomes more effective, and the [proceed to enlarged/reduced copy] key 414 on the document reading operation screen 400 becomes more effective.

In addition, according to the present example, when the single-sided copy service is provided a plurality of times (that is, for documents of a plurality of pages), it is possible to set in which form the receipts related to the provision of the single-sided copy service provided a plurality of times are to be printed. For example, some or all of the receipts related to the single-sided copy services provided a plurality of times can be collectively printed. This greatly contributes to improvement in user friendliness. With the receipts thus collectively printed, the consumption of the roll paper for the receipts is reduced.

The CPU 18*a* of the present example, in particular, the CPU 18*a* that executes the screen display control task is an example of a display controller according to the disclosure. The portal screen 100 of the present example is an example of a service selection screen according to the disclosure. Furthermore, the [redo setting from beginning] key 514, the [continue with same setting] key 516, and the [end] key 518 on the service continuation confirmation screen 500 of the present example are examples of a first operation key, a second operation key, and a third operation key according to the disclosure, respectively. The color type selection screen 200 of the present example is an example of a first screen according to the disclosure, and the document reading operation screen 400 of the present example is an example of a second screen according to the disclosure. The service end screen of the present example is an example of a third screen, and the receipt setting screen 600 is another example of the third screen.

In addition, the paper size selection screen 300 of the present example is an example of a fourth screen according to the disclosure, and the [proceed to enlarged/reduced copy] key 330 on the paper size selection screen 300 is an example of a fourth operation key according to the disclosure. The document reading operation screen 400 of the present example is an example of the second screen according to the disclosure and is also an example of the fourth screen according to the disclosure as described above, and the [proceed to enlarged/reduced copy] key 414 on the document reading operation screen 400 is also an example of the fourth operation key according to the disclosure. In the present example, when the [proceed to enlarged/reduced copy] key 330 on the paper size selection screen 300 is operated or the [proceed to enlarged/reduced copy] key 414 on the document reading operation screen 400 is operated, the enlargement/reduction setting screen 800 is displayed on the display 36*a*. The enlargement/reduction setting screen 800 is an example of a predetermined operation screen according to the disclosure. With such an operation, the image forming device 10 transitions from the state of providing the single-sided copy service to the state of providing the miscellaneous copy service. The miscellaneous copy service in this case is an example of another service according to the disclosure.

The present example is one specific example of the disclosure, and does not limit the technical scope of the disclosure. The disclosure can be applied to aspects other than these examples.

For example, the configurations (designs) of the screens including the portal screen 100 are merely examples, and other configurations may be employed. In particular, regarding the service continuation confirmation screen 500, in addition to the [redo setting from beginning] key 514, the [continue with same setting] key 516, and the [end] key 518, an operation key enabling further transition to another state may be provided as appropriate.

Furthermore, while the single-sided copy service is described as an example in the present example, the disclosure can be similarly applied to other services such as miscellaneous copy service.

Furthermore, in the present example, the image forming device 10 is referenced as an example, but the disclosure can also be applied to an information processing device other than the image forming device 10.

The disclosure is not limited to a form of a device as an information processing device, and may be provided in the form of a method as a display control method for the information processing device, and the form of a program as a display control program for the information processing device.

Furthermore, the disclosure can be provided in the form of a non-transitory computer-readable recording medium recording the display control program for the information processing device. In this case, the computer of the information processing device reads and executes the display control program recorded in the recording medium to implement an information processing device similar to that of the disclosure. The recording medium as used herein includes a semiconductor medium and a disk medium similar to those described above. In addition, not a portable medium but an embedded (built-in) medium such as a ROM or a hard disk drive which is embedded in an information processing device (computer system) is also applicable as the recording medium as used herein.

REFERENCE SIGNS LIST

- 10 Image forming device
- 12 Image scanner
- 14 Image former
- 18 Controller
- **18*a*** CPU
- **18*b*** Main storage
- 36 Operation display unit
- **36*a*** Display
- **36*b*** Touch panel
- 100 Portal screen
- 200 Color type selection screen (example of first screen)
- 300 Paper size selection screen (example of fourth screen)
- 330 [Proceed to enlarged/reduced copy] key (example of a fourth operation key)
- 400 Document reading operation screen (example of second screen and fourth screen)
- 414 [Proceed to enlarged/reduced copy] key (example of a fourth operation key)
- 500 Service continuation confirmation screen
- 514 [Redo setting from beginning] key (example of first operation key)
- 516 [Continue with same setting] key (example of second operation key)
- 518 [End] key (example of third operation key)
- 600 Receipt setting screen (another example of third screen)

The invention claimed is:

1. An information processing device capable of providing a plurality of services, the information processing device comprising:

an operation display that displays various screens and receives an operation by a user; and a display controller that causes the operation display to display, for each of the plurality of services and in a predetermined order, a plurality of operation screens used to receive the operation by the user after one service of the plurality of services is selected and until provision of the one service ends, wherein;

the display controller causes the operation display to display, when ending the provision of the one service, a service continuation confirmation screen prompting the user to confirm whether to continue the one service, the service continuation confirmation screen being one of the plurality of operation screens, and the service continuation confirmation screen includes a plurality of operation keys including:

a first operation key used to instruct the operation display to display a first screen that is one of the plurality of operation screens, the first screen being used to receive an operation by the user to reset a condition related to the one service, and a second operation key used to instruct the operation display to display a second screen that is another one of the plurality of operation screens being different from the first screen, the second screen being used to receive an operation by the user to execute the provision of the one service under a condition identical to a currently-set condition.

2. The information processing device according to claim 1, wherein the plurality of operation keys further includes a third operation key used to instruct the end of the provision of the one service.

3. The information processing device according to claim 1, wherein:

the display controller further causes the operation display to display a service selection screen on which the user selects any of the plurality of services, when any service of the plurality of services, including the one service, is selected on the service selection screen, the display controller further causes the operation display to display, in the predetermined order, the plurality of operation screens, including a first operation screen, corresponding to the service selected on the service selection screen, and the first screen is the first operation screen.

4. The information processing device according to claim 3, wherein a fourth screen includes a fourth operation key used to instruct the operation display to display a predetermined one of the plurality of operation screens of another one of the plurality of services, the fourth screen being a specific operation screen of the plurality of operation screens after the first screen in the predetermined order.

5. The information processing device according to claim 1, wherein the plurality of operation keys is arranged adjacent to each other.

6. The information processing device according to claim 2, further comprising:

a receipt issuer that issues a receipt related to the provision of the one service when the provision of the one service ends in response to an operation by the user received through the third operation key, wherein the receipt issuer is capable of collectively issuing, when the one service related to the receipt is provided a plurality of times, some or all receipts, including the receipt, related to the one service that is provided the plurality of times.

7. The information processing device according to claim 6, wherein:

the display controller further causes, when the one service related to the receipt is provided the plurality of times, the operation display to display a receipt setting screen, on which the user sets in which form the receipt is to be issued for the one service that is provided the plurality of times, and the receipt issuer issues the receipt in a form corresponding to setting content of the receipt setting screen.

8. The information processing device according to claim 1, wherein the plurality of services includes a copy service in which an image of a document is copied onto a sheet-like image recording medium.

9. A display control method performed by an information processing device capable of providing a plurality of services and including an operation display that displays various screens and receives an operation by a user, the display control method comprising:

controlling the operation display to display, for each of the plurality of services and in a predetermined order, a plurality of operation screens used to receive the operation by the user after one service of the plurality of services is selected and until provision of the one service ends; and controlling the operation display to display, when ending the provision of the one service, a service continuation confirmation screen prompting the user to confirm whether to continue the one service, the service continuation confirmation screen being one of the plurality of operation screens, wherein the service continuation confirmation screen includes a plurality of operation keys including:

a first operation key used to instruct the operation display to display a first screen that is one of the plurality of operation screens, the first screen being used to receive an operation by the user to reset a condition related to the one service, and a second operation key used to instruct the operation display-unit to display a second screen that is another one of the plurality of operation screens being different from the first screen, the second screen being used to receive an operation by the user to execute the provision of the one service under a condition identical to a currently-set condition.

10. A non-transitory computer-readable recording medium coupled to at least one processor in an information processing device and storing one or more computer-executable instructions that, when executed by the at least one processor, cause the information processing device, capable of providing a plurality of services and including an operation display that displays various screens and receives an operation by a user, to:

control the operation display to display, for each of the plurality of services and in a predetermined order, a plurality of operation screens used to receive the operation by the user after one service of the plurality of services is selected and until provision of the one service ends; and control the operation display to display, when ending the provision of the one service, a service continuation confirmation screen prompting the user to confirm whether to continue the one service, the service continuation confirmation screen being one of the plurality of operation screens, wherein the service continuation confirmation screen includes a plurality of operation keys including:

a first operation key used to instruct the operation display to display a first screen that is one of the plurality of operation screens, the first screen being used to receive an operation by the user to reset a condition related to the one service, and a second operation key used to instruct the operation display to display a second screen that is another one of the plurality of operation screens being different from the first screen, the second screen being used to receive an operation by the user to execute the provision of the one service under a condition identical to a currently-set condition.

* * * * *